United States Patent

Hoffmann et al.

[15] 3,687,963
[45] Aug. 29, 1972

[54] THIAZOLO-(THIONO)PHOSPHORIC (PHOSPHONIC) ACID ESTERS

[72] Inventors: Hellmut Hoffmann, Wuppertal-Elberfeld; Ingeborg Hammann; Wolfgang Behrenz, both of Cologne, all of Germany

[73] Assignee: Farbenfabriken Bayer Aktiengesellschaft, Leverkusen, Germany

[22] Filed: Aug. 13, 1970

[21] Appl. No.: 63,614

[30] Foreign Application Priority Data

Aug. 19, 1969 Germany..........P 19 42 013.4

[52] U.S. Cl.............260/302 E, 260/302 S, 424/200
[51] Int. Cl..............................................C07d 91/32
[58] Field of Search..................................260/302 E

[56] References Cited

UNITED STATES PATENTS 3,574,223   4/1971   Ratz et al...............260/302 E

*Primary Examiner*—Alex Mazel
*Assistant Examiner*—R. J. Gallagher
*Attorney*—Burgess, Dinklage & Sprung

[57] ABSTRACT

Thiazolo-(thiono)phosphoric (phosphonic) acid esters carrying a methyl group in the 4-position and a lower alkylmercapto- or a phenylmercapto- group in the 5 position of the thiazole ring, e.g. 0,0-dimethyl-0-[4-methyl-5-methyl-mercaptothiazol -(2)yl]-thionophosphoric acid or 0-methyl-0-[4-methyl-5-phenylmercaptothiazol-(2)yl]-methanephosphonic acid ester, which possess arthropodicidal, especially acaricidal and insecticidal, properties as well as fungicidal properties, and process for their production.

11 Claims, No Drawings

THIAZOLO-(THIONO)PHOSPHORIC (PHOSPHONIC) ACID ESTERS

The present invention relates to and has for its objects the provision of particular new thiazolo-(thiono)phosphoric (phosphonic) acid ester carrying a methyl group in the 4-position and a lower alkylmercapto- or a phenylmercapto-group in the 5-position of the thiazole ring, e.g., 0,0-dimethyl-0-[4-methyl-5-methylmercaptothiazol-(2)yl]-thionophosphoric acid or 0-methyl-0-[4-methyl-5-phenylmercaptothiazol-(2)yl]-methanephosphonic acid ester, which possess arthropodicidal, especially acaricidal and insecticidal, properties, active compositions in the form of mixtures of such compounds with solid and liquid dispersible carrier vehicles, and a method for producing such compounds and for using such compounds in a new way, especially for combating pests, e.g., arthropods and fungi, with other and further objects becoming apparent from a study of the within specification and accompanying examples.

In Deutsche Auslegeschrift (German Published Specification) No. 1,193,953, methylthiaziazol-(thiono)-phosphoric acid derivatives, for example 0,0-diethyl-0-[3-methyl-1,2,4-thiadiazol(5)-yl]-thionophosphoric and 0-ethyl-0-[3-methyl-1,2,4-thiadiazol-5)-yl]-ethanethionophosphonic acid ester, are described; these substances possess pesticidal, in particular insecticidal, activity.

The present invention provides thiazolo-(thiono)phosphoric (phosphonic) acid esters of the general formula

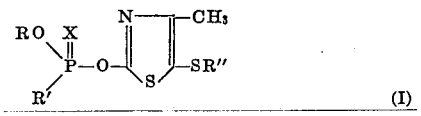

(I)

in which
 R is a straight-chain or branched alkyl radical with one to six carbon atoms,
 R' is a straight-chain or branched alkyl or alkoxy radical with one to six carbon atoms
 R'' is a straight-chain or branched lower alkyl or a phenyl radical, and
 X is an oxygen or sulphur atom.

These compounds have been found to exhibit strong insecticidal, acaricidal and also fungicidal properties.

Preferably R and R' are lower alkyl and more preferably have one to four carbon atoms; thus, R and R' may be methyl, ethyl, n-propyl, iso-propyl, n-butyl, iso-butyl, sec.-butyl or tert.-butyl and R' may also be methoxy, ethoxy, n-propoxy, iso-propoxy, n-butoxy, iso-butoxy, sec.-butoxy or tert.-butoxy.

Preferably, R'' is phenyl or alkyl of one to four carbon atoms, especially methyl or ethyl.

The invention also provides a process for the production of a thiazolo-(thiono)phosphoric(phosphonic) acid ester of the formula (I) in which a (thiono)phosphoric (phosphonic) acid ester halide of the general formula

(II)

is reacted with a 2-hydroxy-4-methyl-5-alkylmercapto- or -5-phenylmercapto-thiazole of the general formula

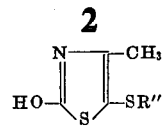

(III)

R, R', R'' and X in the aforesaid formulas possessing the meaning stated above, while Hal stands for a halogen atom, preferably chlorine, the reaction being carried out in the presence of an acid acceptor or using a salt of the thiazole derivative.

Surprisingly, the thiazolo-(thiono)phosphoric(phosphonic)acid esters according to the invention are distinguished by a considerably higher pesticidal, particularly insecticidal and acaricidal, activity than the known methylthiadiazole (thiono)phosphoric acid esters of analogous constitution and the same direction of activity. The substances according to the invention therefore represent a genuine enrichment of the art.

If, 0,0-diethylthionophosphoric acid ester chloride and 2-hydroxy-4-methyl-5-ethylmercaptothiazole are used as starting components, the reaction course can be represented by the following formula scheme:

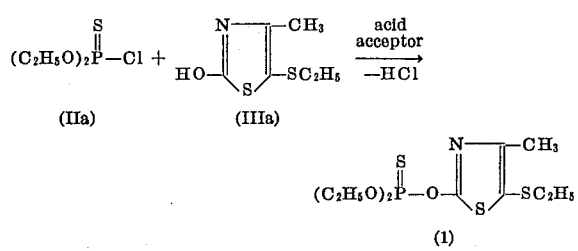

The starting materials to be used for the preparative process are defined by the formulas (II) and (III).

As examples of (thiono)phosphoric(phosphonic) acid ester halides which can be used, there are mentioned in particular: 0,0-dimethyl-, 0,0-diethyl-, 0,0-diisopropyl-, 0,0-di-n-butyl-, 0,0-di-tert.-butyl, 0-methyl-0-ethyl-, O-methyl-0-isopropyl-, 0-methyl-0-n-butyl- and 0-methyl-0-tert.-butyl-phosphoric acid ester chloride or bromide as well as the corresponding thiono analogues, further, 0-methyl-methane-, 0-ethyl-methane, 0-isopropyl-methane-, 0-ethyl-ethane, 0-isopropyl-ethane-, 0-butyl-ethane, 0-methyl-propane-, 0-ethyl-propane, 0-ethyl-isopropane-phosphonic acid ester chloride or bromide and the corresponding thiono compounds.

The acid ester halides (II) required as starting materials are already described in the literature. The thiazole derivatives (III) (some of which are known) can be prepared for example by reacting 1-alkyl- or -phenyl-mercapto-1-chloroacetone of the formula

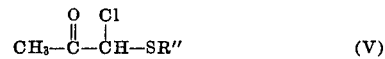

(V)

with 0-alkylthiocarbamic acid esters of the formula

(VI)

R and R'' having the meanings stated above.

The aromatic of the invention is preferably carried out in the presence of a solvent which term includes a mere diluent. As such, practically all inert organic solvents are suitable. These include, in particular, aliphatic and aromatic (possibly chlorinated) hydrocarbons, for example benzene, chlorobenzene, toluene, xylene, benzine, methylene chloride, chloroform and carbon tetrachloride; ethers, such as diethyl ether, dibutyl ether and dioxan; ketones, for example acetone, methylethyl ketone, methylisopropyl ketone and methylisobutyl ketone; and nitriles, such as acetonitrile.

As mentioned above, the reaction may be carried out in the presence of an acid acceptor. For this purpose, practically all customary acid-binding agents can be used. Particularly suitable have proved to be alkali metal carbonates and alcoholates, such as sodium and potassium carbonate, methylate or ethylate; and aliphatic, aromatic or heterocyclic amines, for example triethylamine, dimethylamine, dimethylaniline, dimethylbenzylamine and pyridine.

Instead of working in the presence of an acid acceptor, it is possible first to prepare a salt, preferably an alkali metal or ammonium salt, of the 2-hydroxy-4-methyl-5-alkyl-mercapto- or -5-phenylmercaptothiazole (III) and to react the salt with the (thiono)phosphoric(phosphonic) acid ester halide (II).

The reaction temperature can be varied within a fairly wide range. In general, the reaction is carried out at 30° to 100° C, preferably at 60° to 70° C. The reaction is, in general, carried out at normal pressure.

In carrying out the process, equimolar proportions of the starting components may be reacted in one of the above-mentioned solvents at the stated temperatures in the presence of an acid acceptor. After being stirred while hot for several hours, the reaction mixture may be poured into water, taken up with a hydrocarbon, preferably benzene, and worked up in known manner.

The substances according to the invention are obtained in most cases in the form of colorless to slightly yellow-colored, viscous, water-insoluble oils which cannot be distilled without decomposition, but which can, by so-called "slight distillation," that is, longer heating to moderately elevated temperatures under reduced pressure, be freed from the last volatile components and in this way be purified. The compounds can be characterized especially by their refractive indices.

As already mentioned above, the new compounds are distinguished by an outstanding effectiveness against plant pests, hygiene pests and pests of stored products, particularly against sucking and biting insects, as well as mites. They possess, at the same time, fungicidal and bactericidal properties, with low phytotoxicity. The pesticidal effect sets in rapidly and lasts for a long time.

For these reasons, the compounds according to the invention may be used with success as pesticides in crop protection and in the protection of stored products, as well as in the hygiene field.

To the sucking insects there belong, in the main, aphids (*Aphidae*) such as the green peach aphid (*Myzus persicae*), the bean aphid (*Doralis fabae*), the bird cherry aphid (*Rhopalosiphum padi* ), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as Euscelis bilobatus and *Nephotettix bipunctatus;* and the like.

In the case of the biting insects, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*), further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater was moth (*Galleria mellonella*); and the like.

Also to be classed with the biting insects are beetles (*Coleoptera*), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The *Diptera* comprise essentially the flies, such as the vinegar fly (*Drosophila melanogaster*), the Mediterranean fruit fly (*Ceratitis capitata*), house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*)

and the malaria mosquito (*Anopheles stephensi*); and the like.

With the mites (*Acari*) there are classed, in particular, the spider mites (*Tetranychidae*) such as the two-spotted spider mite (*Tetranychus telarius* = *Tetranychus althaeae* or *Tetranychus urticae*) and the European red mite (*Paratetranychus pilosus* = *Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the new compounds are also distinguished by an outstanding residual effect on wood and clay, as well as a good stability to alkali on limed substrates.

The active compounds according to the instant invention can be utilized, if desired, in the form of the usual formulations or compositions with conventional inert (i.e., plane compatible or herbicidally inert) pesticide diluents or extenders, i.e., diluents or extenders of the type usable in conventional pesticide formulations or compositions, e.g., conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose:
inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzene, etc), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanol-amine, etc.), ethers, ether-alcohols (e.g., glycol mono-methyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricies, insecticides, rodenticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant e.g., a surface-active agent, such as an emulsifying agent and/or a dispersing agent, and an amount of the active compound which is effective for the purpose in question and which is generally between about 0.001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling pests, e.g., arthropods, i.e., insects and acarids, as well as fungi, and more particularly methods of combating at least one of insects, acarids and fungi which comprise applying to at least one of correspondingly (a) such insects, (b) such acarids, (c) such fungi, and (d) the corresponding habitat, i.e., the locus to be protected, a corespondingly combative or toxic amount, i.e., an arthropodicidally especially insecticidally or acaricidally, or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Plutella Test
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100 percent means that all the caterpillars are killed whereas 0 percent means that none of the caterpillars are killed.

The active compounds, the concentrations of the active compounds, the evaluation times and the results can be seen from Table 1.

TABLE 1
(Plutella test)

| Active compound | Concentration of active compound in percent | Degree of destruction in percent after 3 days |
|---|---|---|
| (A) 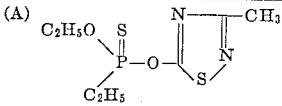 (known) | 0.01 | 0 |
| (B) 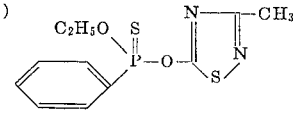 (known) | 0.01 | 0 |
| (2) 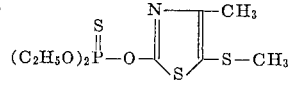 | 0.01 | 100 |
| (3) 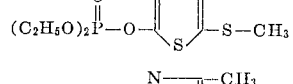 | 0.01 | 100 |
| (4) 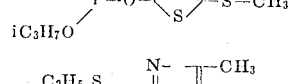 | 0.01 | 100 |
| (5) 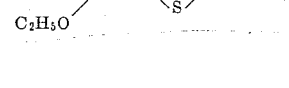 | 0.01 | 95 |

TABLE 1—Continued
(Plutella test)

| Active compound | Concentration of active compound in percent | Degree of destruction in percent after 3 days |
|---|---|---|
| (1) 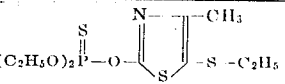 | 0.01 | 100 |
| (6) 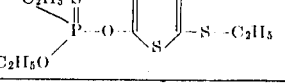 | 0.01 | 100 |

EXAMPLE 2

Myzus test (contact action)
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from Table 2.

TABLE 2
(Myzus test)

| Active compound (constitution) | Concentration of active compound in percent | Degree of destruction in percent after 24 hours |
|---|---|---|
| (C) 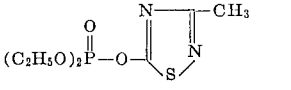 (known) | 0.1<br>0.01<br>0.001 | 100<br>40<br>0 |
| (D) 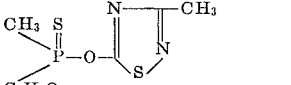 (known) | 0.1<br>0.01 | 100<br>0 |
| (E) 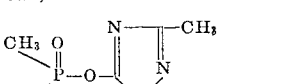 (known) | 0.1<br>0.01 | 100<br>0 |
| (A) 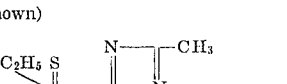 (known) | 0.1<br>0.01 | 100<br>0 |
| (B) 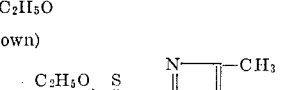 (known) | 0.1 | 0 |

TABLE 2—Continued (Myzus test)

| Active compound (constitution) | Concentration of active compound in percent | Degree of destruction in percent after 24 hours |
|---|---|---|
| (2) $(C_2H_5O)_2\overset{S}{\underset{\|}{P}}-O-\underset{S}{\overset{N}{\underset{}{\bigcirc}}}\overset{CH_3}{\underset{S-CH_3}{}}$ | 0.1<br>0.01<br>0.001 | 100<br>100<br>98 |
| (3) $(C_2H_5O)_2\overset{O}{\underset{\|}{P}}-O-\underset{S}{\overset{N}{\underset{}{\bigcirc}}}\overset{CH_3}{\underset{S-CH_3}{}}$ | 0.1<br>0.01 | 100<br>99 |
| (4) $\underset{iC_3H_7O}{\overset{CH_3}{\diagdown}}\overset{S}{\underset{\|}{P}}-O-\underset{S}{\overset{N}{\underset{}{\bigcirc}}}\overset{CH_3}{\underset{S-CH_3}{}}$ | 0.1<br>0.01 | 100<br>100 |
| (5) $\underset{C_2H_5O}{\overset{C_2H_5}{\diagdown}}\overset{S}{\underset{\|}{P}}-O-\underset{S}{\overset{N}{\underset{}{\bigcirc}}}\overset{CH_3}{\underset{S-CH_3}{}}$ | 0.1<br>0.01<br>0.001 | 100<br>100<br>40 |
| (1) $(C_2H_5O)_2\overset{S}{\underset{\|}{P}}-O-\underset{S}{\overset{N}{\underset{}{\bigcirc}}}\overset{CH_3}{\underset{S-C_2H_5}{}}$ | 0.1<br>0.01<br>0.001 | 100<br>100<br>100 |
| (7) $(C_2H_5O)_2\overset{S}{\underset{\|}{P}}-O-\underset{S}{\overset{N}{\underset{}{\bigcirc}}}\overset{CH_3}{\underset{S-\text{Ph}}{}}$ | 0.1<br>0.01 | 100<br>90 |
| (8) $(C_2H_5O)_2\overset{O}{\underset{\|}{P}}-O-\underset{S}{\overset{N}{\underset{}{\bigcirc}}}\overset{CH_3}{\underset{S-\text{Ph}}{}}$ | 0.1<br>0.01<br>0.001 | 100<br>95<br>30 |

EXAMPLE 3

Tetranychus test
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from Table 3.

TABLE 3

(Tetranychus test)

| Active compound (constitution) | Concentration of active compound in percent | Degree of destruction in percent after 48 hours |
|---|---|---|
| (E) $\underset{C_2H_5O}{\overset{CH_3}{\diagdown}}\overset{O}{\underset{\|}{P}}-O-\underset{S}{\overset{N}{\underset{}{\bigcirc}}}\overset{CH_3}{\underset{N}{}}$ (known) | 0.1<br>0.01 | 98<br>0 |
| (2) $(C_2H_5O)_2\overset{S}{\underset{\|}{P}}-O-\underset{S}{\overset{N}{\underset{}{\bigcirc}}}\overset{CH_3}{\underset{S-CH_3}{}}$ | 0.1 | 100 |
| (3) $(C_2H_5O)_2\overset{O}{\underset{\|}{P}}-O-\underset{S}{\overset{N}{\underset{}{\bigcirc}}}\overset{CH_3}{\underset{S-CH_3}{}}$ | 0.1<br>0.01 | 100<br>30 |
| (4) $\underset{iC_3H_7O}{\overset{CH_3}{\diagdown}}\overset{S}{\underset{\|}{P}}-O-\underset{S}{\overset{N}{\underset{}{\bigcirc}}}\overset{CH_3}{\underset{S-CH_3}{}}$ | 0.1 | 100 |
| (8) $(C_2H_5O)_2\overset{O}{\underset{\|}{P}}-O-\underset{S}{\overset{N}{\underset{}{\bigcirc}}}\overset{CH_3}{\underset{S-\text{Ph}}{}}$ | 0.1 | 100 |

EXAMPLE 4

$LT_{100}$ test for Diptera
Test insects: *Musca domestica*
Solvent: Acetone

Two parts by weight of active compound are dissolved in 1,000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remain uncovered until the solvent has completely evaporated. The amount of active compound per square of filter paper varies with the concentration of the solution of active compound used. About 25 test insects are then placed in the Petri dish and it is covered with a glass lid.

The condition of the test insects is continuously observed. The time which is necessary for a 100 percent knockdown effect is determined.

The test insects, the active compounds, the concentrations of the active compounds and the period of time at which there is a 100 percent knowndown effect can be seen from Table 4.

TABLE 4

($LT_{100}$ test for Diptera)

| Active compounds | Concentration of active compound of the solution in percent | $LT_{100}$ |
|---|---|---|
| (E) $\underset{C_2H_5O}{\overset{CH_3}{\diagdown}}\overset{O}{\underset{\|}{P}}-O-\underset{S}{\overset{N}{\underset{}{\bigcirc}}}\overset{C-CH_3}{\underset{N}{}}$ (known) | 0.2<br>0.02 | 180'<br>$8^h=30$ |

TABLE 4—Continued
(LT$_{100}$ test for Diptera)

| Active compounds | Concentration of active compound of the solution in percent | LT$_{100}$ |
|---|---|---|
| (B) C$_2$H$_5$O—P(S)(—O—C(phenyl))—N=C(CH$_3$)—S (thiazoline) (known) | 0.2 | 6$^h$=100% 8$^h$=0 |
| (5) C$_2$H$_5$—P(S)(OC$_2$H$_5$)—O—[N=C(CH$_3$)—C(S—CH$_3$)=]S (thiazole) | 0.2 0.02 0.002 | 65' 120' 8$^h$=40% |
| (6) C$_2$H$_5$—P(S)(OC$_2$H$_5$)—O—[N=C(CH$_3$)—C(S—C$_2$H$_5$)=]S | 0.2 0.02 0.002 | 80' 155' 8$^h$=80% |
| (9) C$_2$H$_5$—P(S)(OC$_2$H$_5$)—O—[N=C(CH$_3$)—C(S—phenyl)=]S | 0.2 0.02 0.002 | 120' 145' 8$^h$=50% |

TABLE 5

Residual test
  Test insects:  *Musca domestica* and *Aedes aegypti*
  Powder of basic wetting agent consisting of:
    3% sodium diisobutylnaphthalene-1-sulphonate
    6% sulphate waste liquor, partially condensed with aniline
    40% highly dispersed silicic acid, CaO-containing
    51% colloidal kaolin To produce a suitable preparation of active compound, 1 part by weight of active compound is mixed intimately with 9 parts by weight of the powder of the basic wetting agent. The spray powder so obtained is suspended in 90 parts of water.

The suspension of active compound is sprayed, in an applied amount of 1 g of active compound per square meter, on to substrates consisting of various materials.

The sprayed coatings are treated for their biological activity at specified time intervals.

For this purpose, the test insects are placed on the treated substrates. Over the animals is placed a squat cylinder which is closed at its upper end with a wire mesh to prevent the insects from escaping. After 8 hours residence period of the insects on the substrate, the destruction of the test insects is determined as a percentage.

The active compounds, the nature of the test substrates and the results can be seen from Table 5.

EXAMPLE 6

LT$_{100}$ test for Diptera
  Test insects:  *Aedes aegypti*
  Solvent:  Acetone Two parts by weight of the active compound are dissolved in 1,000 parts by volume of the solvent. The solution so obtained is diluted with further solvent to the desired concentrations.

2.5 ml of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100 percent knockdown effect is determined.

The test insects, the active compounds, the concentrations of the active compounds and the periods of time at which there is a 100 percent knockdown effect can be seen from Table 6.

TABLE 6
(LT$_{100}$ test for Diptera)

| Active compound (constitution) | Concentration of active compound of the solution in percent | LT$_{100}$ |
|---|---|---|
| (B) C$_2$H$_5$O—P(S)(phenyl)—O—[N=C(CH$_3$)—N=]S (known) | 0.2 | 3$^h$=0% |
| (C) (C$_2$H$_5$O)$_2$P(O)—O—[N=C(CH$_3$)—N=]S (known) | 0.2 0.02 | 60' 3$^h$=90% |
| (2) (C$_2$H$_5$O)$_2$P(S)—O—[N=C(CH$_3$)—C(SCH$_3$)=]S | 0.2 0.02 0.002 | 60' 60' 3$^h$=80% |
| (1) (C$_2$H$_5$O)$_2$P(S)—O—[N=C(CH$_3$)—C(SC$_2$H$_5$)=]S | 0.2 0.02 0.002 | 60' 120' 3$^h$=80% |

TABLE 5
(Residual test)

| Active compound (constitution) | Test substrates | Test insects | Destruction of the test insects in percent Age of the residual coatings in weeks | | | | |
|---|---|---|---|---|---|---|---|
| | | | 1 | 2 | 3 | 4 | 6 |
| (2) (C$_2$H$_5$O)$_2$P(S)—O—[N=C(CH$_3$)—C(SCH$_3$)=]S | Clay | *Musca domestica* | 100 | 100 | 100 | 100 | 100 |
| | Plywood | *Musca domestica* | 100 | 100 | 100 | 100 | 70 |
| | Clay | *Aedes aegypti* | 100 | 100 | 100 | 100 | 100 |
| | Plywood | *Aedes aegypti* | 100 | 100 | 100 | 100 | 100 |
| (9) C$_2$H$_5$—P(S)(OC$_2$H$_5$)—O—[N=C(CH$_3$)—C(S—phenyl)=]S | Clay | *Musca domestica* | 100 | 100 | 100 | 100 | 100 |
| | Plywood | *Musca domestica* | 100 | 100 | 100 | 100 | 100 |
| | Clay | *Aedes aegypti* | 100 | 100 | 100 | 100 | 100 |
| | Plywood | *Aedes aegypti* | 100 | 100 | 100 | 100 | 100 |

TABLE 6—Continued (LT₁₀₀ test for Diptera)

| Active compound (constitution) | Concentration of of active compound of the solution in percent | LT₁₀₀ |
|---|---|---|
| (5) C₂H₅–P(S)(OC₂H₅)–O–[N=C(CH₃)–S–C(SCH₃)]thiazole | 0.2<br>0.02<br>0.002 | 60'<br>120'<br>180' |
| (6) C₂H₅–P(S)(OC₂H₅)–O–[N=C(CH₃)–S–C(SC₂H₅)]thiazole | 0.2<br>0.02 | 60'<br>120' |
| (8) (C₂H₅O)₂P(O)–O–[N=C(CH₃)–C–S–C(S–C₆H₅)] | 0.2<br>0.02<br>0.002 | 60'<br>60'<br>3ʰ=40% |
| (9) C₂H₅–P(S)(OC₂H₅)–O–[N=C(CH₃)–S–C(S–C₆H₅)]thiazole | 0.2<br>0.02<br>0.002 | 120'<br>180'<br>180' |

EXAMPLE 7

Mosquito larvae test
Test insects: *Aedes aegypti* (5th larval stage)
Solvent: 99 parts by weight acetone
Emulsifier: 1 part by weight benzyl hydroxydiphenyl polyglycol ether To produce a suitable preparation of active compound, 2 parts by weight of the active compound are dissolved in 1,000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100 percent means that all the larvae are killed. 0 percent means that no larvae at all are killed.

The active compounds, the concentrations of the active compounds, the test insects and the results can be seen from Table 7.

TABLE 7

(Mosquito larvae test)

| Active compound (constitution) | Concentration of active compound of the solution in p.p.m. | Degree of destruction in percent |
|---|---|---|
| (A) C₂H₅–P(S)(OC₂H₅)–O–[N=C(CH₃)–S]thiazole (known) | 10<br>1 | 100<br>0 |
| (B) C₂H₅O–P(S)(C₆H₅)–O–[N=C(CH₃)–S]thiazole (known) | 10 | 90 |
| (2) (C₂H₅O)₂P(S)–O–[N=C(CH₃)–S–C(S–CH₃)]thiazole | 0.1<br>0.01 | 100<br>90 |

TABLE 7—Continued (Mosquito larvae test)

| Active compound (constitution) | Concentration of active compound of the solution in p.p.m. | Degree of destruction in percent |
|---|---|---|
| (1) (C₂H₅O)₂P(S)–O–[N=C(CH₃)–S–C(S–C₂H₅)]thiazole | 0.01<br>0.001 | 100<br>40 |
| (4) CH₃–P(S)(i-C₃H₇O)–O–[N=C(CH₃)–S–C(S–CH₃)]thiazole | 1<br>0.1 | 100<br>80 |
| (5) C₂H₅–P(S)(OC₂H₅)–O–[N=C(CH₃)–S–C(S–CH₃)]thiazole | 0.1<br>0.01 | 100<br>0 |
| (6) C₂H₅–P(S)(OC₂H₅)–O–[N=C(CH₃)–S–C(S–C₂H₅)]thiazole | 0.1<br>0.01 | 100<br>0 |
| (7) (C₂H₅O)₂P(S)–O–[N=C(CH₃)–C–S–C(S–C₆H₅)]thiazole | 0.1<br>0.001 | 100<br>50 |
| (9) C₂H₅–P(S)(OC₂H₅)–O–[N=C(CH₃)–C–S–C(S–C₆H₅)]thiazole | 1<br>0.1 | 100<br>60 |

The following further examples are set forth to illustrate, without limitation, the process for producing the active compounds according to the present invention.

EXAMPLE 8

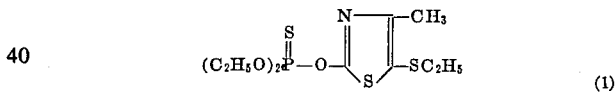

(1)

17.5g (0.1 mole) of 2-hydroxy-4-methyl-5-ethylmercaptothiazole and 14 g potassium carbonate are stirred together in 100 ml acetonitrile with 19 g 0,0-diethylthiono-phosphoric acid ester chloride for 3 hours at 60° to 70° C. The reaction mixture is then poured into water, taken up with benzene, the benzene extract is dried, the solvent is removed under reduced pressure and the residue is slightly distilled.

The yield is 26 g (80 percent of the theory). The 0,0-diethyl-0-[4-methyl-5-ethylmercaptothiazol-(2)yl]thiono-phosphoric acid ester possesses the refractive index $n_D^{25} = 1.5308$.

| | N | S | P |
|---|---|---|---|
| Calculated for C₁₀H₁₈O₃NS₃P (m.w. 327) | 4.3%; | 29.4%; | 9.5%; |
| Found: | 4.3%; | 28.4% | 10.06%. |

| Constitution | Refractive index |
|---|---|
| (6) C₂H₅O–P(S)(C₂H₅)–O–[N=C(CH₃)–S–C(SC₂H₅)]thiazole | $n_D^{20} = 1.5482$ |
| (4) iC₃H₇O–P(S)(CH₃)–O–[N=C(CH₃)–S–C(SCH₃)]thiazole | $n_D^{22} = 1.5507$ |

Table—Continued

| Constitution | Refractive index |
|---|---|
| (2) (C₂H₅O)₂P(S)-O-[thiazole ring with N, CH₃, S, SCH₃] | $n_D^{23} = 1.5379$ |
| (3) (C₂H₅O)₂P(O)-O-[thiazole ring with N, CH₃, S, SCH₃] | $n_D^{23} = 1.5105$ |
| (6) C₂H₅(S)P(OC₂H₅)-O-[thiazole ring with N, CH₃, S-phenyl] | $n_D^{22} = 1.5903$ |
| (5) C₂H₅(S)P(OC₂H₅)-O-[thiazole ring with N, CH₃, SCH₃] | $n_D^{22} = 1.5541$ |
| (7) (C₂H₅O)₂P(S)-O-[thiazole ring with N, CH₃, S-phenyl] | $n_D^{23} = 1.5739$ |
| (8) (C₂H₅O)₂P(O)-O-[thiazole ring with N, CH₃, S-phenyl] | $n_D^{22} = 1.5322$ |

Analogously, the following compounds are prepared:

The 2- hydroxy-4-methyl-5-alkylmercapto- or 5-phenyl-mercapto-thiazoles required as starting materials can be prepared for example as follows:

EXAMPLE 9

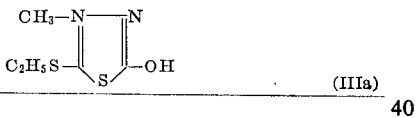
(IIIa)

153 g (1mole) of 1-ethylmercapto-1-chloroacetone and 92 g (1 mole) of 0-ethylthiocarbamic acid ester are reacted at 90° to 100° C for 1 hour. The mixture is then dissolved in a solution of sodium hydroxide, the product is precipitated with hydrochloric acid, filtered and dried.

The yield is 60 percent of the theory. The 2-hydroxy-4-methyl-5-ethylmercaptothiazole melts at 60° C.

| | N | S |
|---|---|---|
| Calculated for C₆H₉ONS₂ (m.w. 175): | 8.0%; | 36.6 %; |
| Found | 7.82%; | 36.38%. |

In analogous manner, the following starting materials are obtained:

(16) 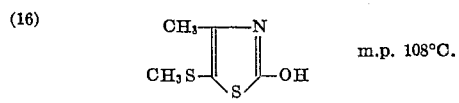 m.p. 108°C.

(17) 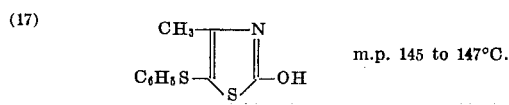 m.p. 145 to 147°C.

It will be realized that all of the foregoing compounds contemplated by the present invention possess the desired selective pesticidal, especially arthropodidicidal, i.e., insecticidal or acaricidal, properties for combating insects, acarids and fungi, and that such compounds have not only a very slight toxicity toward warm-blooded creatures, but also a concomitantly low phytotoxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Thiazolo-(thiono)phosphoric (phosphonic) acid esters of the formula

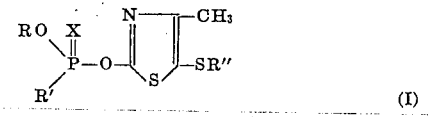
(I)

in which
R is a straight-chain or branched alkyl radical with one to six carbon atoms,
R' is a straight-chain or branched alkyl or alkoxy radical with one to six carbon atoms,
R'' is a straight-chain or branched lower alkyl radical or a phenyl radical, and
X is an oxygen or sulphur atom.

2. Compound according to claim 1 in which R and R' are lower alkyl and R'' is methyl, ethyl or phenyl.

3. Compound according to claim 1 wherein such compound is 0,0-diethyl-0-[4-methyl-5-methylmercaptothiazol-(2)yl]-thionophosphoric acid ester of the formula

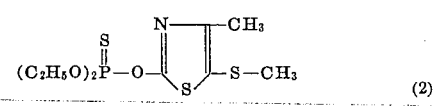
(2)

4. Compound according to claim 1 wherein such compound is 0,0-diethyl-0-[4-methyl-5-methylmercaptothiazol-(2)yl]-phosphoric acid ester of the formula

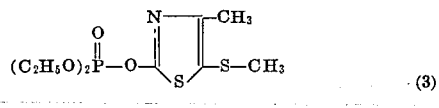
(3)

5. Compound according to claim 1 wherein such compound is 0-isopropyl-[4-methyl-5-methylmercaptothiazol-(2)yl]-methane-thionophosphonic acid ester of the formula

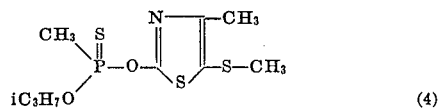
(4)

6. Compound according to claim 1 wherein such compound is 0-ethyl-0-[4-methyl-5-methylmercaptothiazol-(2)yl]-ethane-thionophosphonic acid ester of the formula

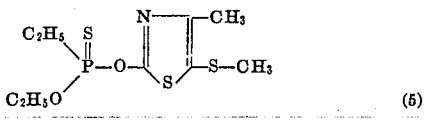
(5)

7. Compound according to claim 1 wherein such compound is 0,0-diethyl-0-[4-methyl-5-ethylmercaptothiazol-(2)yl]-thionophosphoric acid ester of the formula

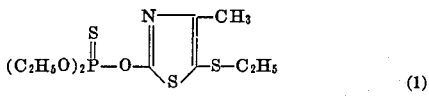
(1)

8. Compound according to claim 1 wherein such compound is 0-ethyl-0-[4-methyl-5-ethylmercaptothiazol-(2)yl]-ethane-thionophosphonic acid ester of the formula

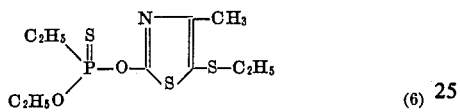
(6)

9. Compound according to claim 1 wherein such compound is 0,0-diethyl-0-[4-methyl-5-phenylmercaptothiazol-(2)yl]-phosphoric acid ester of the formula

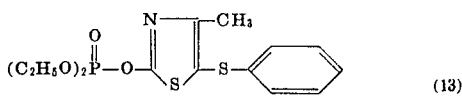
(13)

10. Compound according to claim 1 wherein such compound is 0,0-diethyl-0-[4-methyl-5-phenylmercapto-thiazol-(2)yl]-thionophosphoric acid ester of the formula

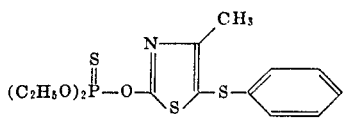

11. Compound according to claim 1 wherein such compound is 0-ethyl-0-[4-methyl-5-phenylmercaptothiazol-(2)yl]-ethane-thionophosphonic acid ester of the formula

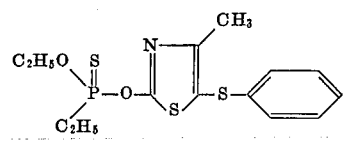

* * * * *

UNITED STATES PATENT OFFICE
CERTIFICATE OF CORRECTION

Patent No. 3,687,963        Dated August 29, 1972

Inventor(s) Hellmut Hoffmann et al

It is certified that error appears in the above-identified patent and that said Letters Patent are hereby corrected as shown below:

Col. 2, line 67

"aromatic" should be -- process --

Col. 5, line 22

"plane" should be -- plant --

Col. 6, line 5

"acaricies" should be -- acaricides --

Col. 10, line 65

"30" should be -- 30% --

Col. 11, line 26

"Table 5" should be -- Example 5 --

Col. 13, line 29

"benzy lhydroxydiphenyl" should be -- benzylhydroxy-
diphenyl --

Col. 14, line 59

The following sentence omitted:
"Analogously, the following compounds are prepared"

UNITED STATES PATENT OFFICE
CERTIFICATE OF CORRECTION

Patent No. 3,687,963              Dated August 29, 1972

Inventor(s) Hellmut Hoffmann et al

It is certified that error appears in the above-identified patent and that said Letters Patent are hereby corrected as shown below:

Col. 15, line 24

"1.5322" should be -- 1.5522 --

Col. 15, line 29 delete "Analogously, the following compounds are prepared"

Signed and sealed this 13th day of February 1973.

(SEAL)
Attest:

EDWARD M. FLETCHER, JR.
Attesting Officer

ROBERT GOTTSCHALK
Commissioner of Patents